US012770262B2

(12) United States Patent
Stancanello et al.

(10) Patent No.: US 12,770,262 B2
(45) Date of Patent: Oct. 20, 2026

(54) METHODS FOR TRAINING AT LEAST A PREDICTION MODEL, OR FOR PROCESSING AT LEAST A PRE-CONTRAST IMAGE DEPICTING A BODY PART PRIOR TO AN INJECTION OF CONTRAST AGENT USING SAID PREDICTION MODEL

(71) Applicant: GUERBET, Villepinte (FR)

(72) Inventors: Joseph Stancanello, Gif sur Yvette (FR); Philippe Robert, Paris (FR)

(73) Assignee: GUERBET, Villepinte (FR)

( * ) Notice: Subject to any disclaimer, the term of this patent is extended or adjusted under 35 U.S.C. 154(b) by 401 days.

(21) Appl. No.: 18/267,951

(22) PCT Filed: Dec. 20, 2021

(86) PCT No.: PCT/EP2021/086801
§ 371 (c)(1),
(2) Date: Jun. 16, 2023

(87) PCT Pub. No.: WO2022/129634
PCT Pub. Date: Jun. 23, 2022

(65) Prior Publication Data

US 2024/0054648 A1 Feb. 15, 2024

(30) Foreign Application Priority Data

Dec. 18, 2020 (EP) .................................... 20306622

(51) Int. Cl.
*G06K 9/00* (2022.01)
*G06T 7/00* (2017.01)

(52) U.S. Cl.
CPC .. *G06T 7/0014* (2013.01); *G06T 2207/10072* (2013.01); *G06T 2207/20081* (2013.01); *G06T 2207/30168* (2013.01)

(58) Field of Classification Search
CPC ......... G06T 7/0014; G06T 2207/10072; G06T 2207/20081; G06T 2207/30168;
(Continued)

(56) References Cited

U.S. PATENT DOCUMENTS

2017/0316562 A1 11/2017 Haberland et al.
2018/0071452 A1* 3/2018 Sharma ................. A61M 5/007

FOREIGN PATENT DOCUMENTS

CN 108852388 A * 11/2018 ............ A61B 6/481
CN 110996798 A * 4/2020 ............ G16H 50/20
EP 3 586 747 A1 1/2020

OTHER PUBLICATIONS

Extended European Search Report for European Application No. 20306622.0, dated Aug. 10, 2021.

(Continued)

*Primary Examiner* — Xin Jia
(74) *Attorney, Agent, or Firm* — Birch, Stewart, Kolasch & Birch, LLP

(57) ABSTRACT

The present invention relates to a method for processing at least a pre-contrast image depicting a body part prior to an injection of contrast agent, the method being characterized in that it comprises the implementation, by a data processor (11*b*) of a second server (1*b*), of steps of: (a) Obtaining said pre-contrast image; (b) Determining candidate value(s) of at least one injection parameter of said injection of contrast agent by application of a prediction model to said pre-contrast image, such that a theoretical contrast image depicting said body part during injection of contrast agent in accordance with the determined candidate value(s) of said injection parameter(s) is expected to present a target quality level.

9 Claims, 2 Drawing Sheets

(58) Field of Classification Search
CPC .... G06N 3/045; G06N 3/0464; G06N 3/0475; G06N 3/08; G06N 3/09; G06N 3/094; A61B 6/032; A61B 6/481; G01R 33/543; G01R 33/5608; G01R 33/56366; G01R 33/5601
See application file for complete search history.

(56) References Cited

OTHER PUBLICATIONS

International Search Report for International Application No. PCT/EP2021/086801, dated Mar. 11, 2022.

* cited by examiner

METHODS FOR TRAINING AT LEAST A PREDICTION MODEL, OR FOR PROCESSING AT LEAST A PRE-CONTRAST IMAGE DEPICTING A BODY PART PRIOR TO AN INJECTION OF CONTRAST AGENT USING SAID PREDICTION MODEL

FIELD OF THE INVENTION

The field of this invention is that of machine/deep learning.

More particularly, the invention relates to methods for training a convolutional neural network for processing at least a pre-contrast image, and for using such convolution neural network, in particular for the optimization of injection protocol parameters to produce high quality contrast images.

BACKGROUND OF THE INVENTION

Contrast agents are substances used to increase the contrast of structures or fluids within the body in medical imaging.

They usually absorb or alter external radiations emitted by the medical imaging device. In x-rays, contrast agents enhance the radiodensity in a target tissue or structure. In MRIs, contrast agents modify the relaxation times of nuclei within body tissues in order to alter the contrast in the image.

Contrast agents are commonly used to improve the visibility of blood vessels and the gastrointestinal tract.

For instance, perfusion scanning, and in particular perfusion MRI, is an advanced medical imaging technique that the blood consumption of an organ, such as the brain or the heart, to be visualized and quantified.

Perfusion MRI is widely used in clinical practice, notably in neuroimaging for the initial diagnosis and treatment planning of stroke and glioma.

Dynamic susceptibility contrast (DSC) and Dynamic contrast enhanced (DCE), respectively leveraging T2 and T1 effects, are the two most common techniques for perfusion MRI. In both cases, a gadolinium-based contrast agent (GBCA) is injected intravenously to the patient and rapid repeated imaging is performed in order to obtain a temporal sequence of perfusion images.

A typical problem in image acquisition is that the quality of contrast images (i.e. after injection of contrast agent) is sometimes not sufficient for clinical diagnosis.

The root cause relies on the interplay among acquisition parameters (settings of the medical imaging device, such as kVp, spatial resolution, frequency/phase encoding, compress sensing factor, etc.), injection parameters (in particular amount of contrast agent, contrast injection speed, and time delay to acquisition) and physiological parameters (for example cardiac output, patient specific hemodynamics parameters). While the first two groups are controllable variables, the third group cannot be changed but represents a given, fix set of parameters depending on individual patient physiology.

Moreover, it is not easy to precisely adapt the acquisition parameters and/or the injection parameters to the physiological parameters, especially in a dynamic way. Indeed, during a single injection sequence the quality may vary over time if the parameters are not real time adapted.

Therefore, it is very challenging to have a "personalized contrast injection protocol" that would guarantee a suitable image quality.

There is consequently still a need for a new method to determine optimal parameters for contrast enhanced medical imaging.

SUMMARY OF THE INVENTION

For these purposes, the present invention provides according to a first aspect a method for processing at least a pre-contrast image depicting a body part prior to an injection of contrast agent, the method being characterized in that it comprises the implementation, by a data processor of a second server, of steps of:

(a) Obtaining said pre-contrast image;

(b) Determining candidate value(s) of at least one injection parameter of said injection of contrast agent by application of a prediction model to said pre-contrast image, such that a theoretical contrast image depicting said body part during injection of contrast agent in accordance with the determined candidate value(s) of said injection parameter(s) is expected to present a target quality level.

Preferred but non limiting features of the present invention are as it follows:

Step (a) also comprises obtaining value(s) of at least one context parameter of said pre-contrast image; said prediction model using said at least one context parameter as input at step (b) such that said theoretical contrast image has the same value(s) of context parameter(s) as the pre-contrast image.

Said context parameter(s) is (are) physiological parameter(s) and/or acquisition parameter(s).

Said pre-contrast image is acquired by a medical imaging device connected to the second server.

The method comprises a step (c) of providing said determined candidate value(s) of said injection parameter(s) to the medical device, and obtaining in response a real contrast image depicting said body part during injection of contrast agent in accordance with the determined candidate value(s) of said injection parameter(s), acquired by said medical imaging device.

The method comprises a step (d) of determining, by application of a classification model to the real contrast image, a real quality level of said real contrast image.

Step (d) comprises comparing said real quality level with the target quality level.

Said real contrast image, candidate value(s) and real quality level are respectively a i-th real contrast image, i-th candidate value(s) and a i-th real quality level, with $i>0$, the method comprising a step (e) of, if said i-th real quality level is different from the target quality level, determining (i+1)-th candidate value(s) of the injection parameter by application of the prediction model to at least the i-th real contrast image, such that a (i+1)-th theoretical contrast image depicting said body part during injection of contrast agent in accordance with the determined (i+1)-th candidate value(s) of said injection parameter(s) is expected to present the target quality level.

Step (e) comprises combining the i-th real contrast image with the pre-contrast image and/or at least one j-th real contrast image, $0<j<i$, into a combined image, the prediction model being applied to the combined image.

Step (e) comprises, if said i-th real quality level corresponds to the target quality level, keeping the i-th candidate value(s) as the (i+1)-th candidate values; the method comprising a step (f) of providing said (i+1)-th candidate value (s) of said injection parameter(s) to the medical device, and obtaining in response a (i+1)-th real contrast image depicting said body part during injection of contrast agent in accordance with the (i+1)-th candidate value(s) of said injection parameter(s), acquired by said medical imaging device.

The method comprises recursively iterating steps (d) to (f) so as to obtain a sequence of successive contrast images.

Said prediction model and/or said classification model comprises a Convolutional Neural Network, CNN.

According to a second aspect, the invention provides a method for training a prediction model, the method being characterized in that it comprises the implementation, by a data processor of a first server, for each of a plurality of training pre-contrast images from a base of training pre-contrast or contrast images respectively depicting a body part prior to and during an injection of contrast agent, each image being associated to reference value(s) of at least one injection parameter of said injection of contrast agent and a reference quality level, of a step of determining candidate value(s) of said injection parameter(s) by application of the prediction model to said training pre-contrast image, such that a theoretical contrast image depicting said body part during injection of contrast agent in accordance with the determined candidate value(s) of said injection parameter(s) is expected to present a target quality level; and verifying if said theoretical contrast image presents said target quality level.

Preferred but non limiting features of the present invention are as it follows: the method is for further training a classification model, and comprises the implementation, by the data processor of a first server, for each of a plurality of training contrast images from the base, of a step of determining, by application of the classification model to the training contrast image, a candidate quality level of said training contrast images; and comparing this candidate quality level with the reference quality level of the training contrast image.

According to a third and a fourth aspect the invention provides a computer program product comprising code instructions to execute a method according to the first aspect for training at least a prediction model, or according to the second aspect for processing at least a pre-contrast image depicting a body part prior to an injection of contrast agent; and a computer-readable medium, on which is stored a computer program product comprising code instructions for executing said method according to the first aspect for training at least a prediction model, or according to the second aspect for processing at least a pre-contrast image depicting a body part prior to an injection of contrast agent.

BRIEF DESCRIPTION OF THE DRAWINGS

The above and other objects, features and advantages of this invention will be apparent in the following detailed description of an illustrative embodiment thereof, which is to be read in connection with the accompanying drawings wherein.

DETAILED DESCRIPTION OF A PREFERRED EMBODIMENT

Architecture

Two complementary aspects of the present invention are proposed:

- a method for training at least a prediction model for processing at least a pre-contrast image (and possibly a further classification model);
- a method for processing at least a pre-contrast image using the prediction model (and possibly the classification model), advantageously trained according to the previous method.

By pre-contrast image, or "plain" image, it is meant an image depicting a given body part (to be monitored) prior to an injection of contrast agent, for a person or an animal. By contrast image it is meant an image depicting said body part during or after the injection of contrast agent.

In other words, if there is a temporal sequence of images, the first one is the pre-contrast image, and each of the following is a contrast image. Note that the contrast images may be images of a given phase (e.g. arterial, portal, delayed) or fully dynamic contrast enhanced (DCE).

In the preferred case of a perfusion sequence, the (pre-contrast or contrast) images depict "perfusion", i.e. passage of fluid through the lymphatic system or blood vessels to an organ or a tissue. In other words, the images constituting said perfusion sequence are images of the given body part, depicting passage of a fluid within said body part.

The (pre-contrast or contrast) images are either directly acquired, or derived from images directly acquired, by a medical imaging device of the scanner type.

Said imaging with injection of contrast agent may be:

- CT (Computed Tomography)→the medical imaging device is an X-ray rotational scanner capable of tomographic reconstruction;
- MRI (Magnetic Resonance Imaging)→the medical imaging device is an MRI scanner;
- Mammography→the medical imaging device is an X-ray mammograph;
- Etc.

The acquisition of a said image may involve the injection of a contrast agent such as gadolinium (CBCA) for MRI or appropriate x-ray contrast agents.

The prediction model and/or the classification model are two artificial intelligence (AI) algorithms, in particular neural networks (NN—and in particular convolutional neural networks, CNN) but possibly Support Vector Machines (SVM), Random Forests (RF), etc., trained using machine learning (ML) or Deep Learning (DL) algorithms. In the following description we will take the preferred example of two CNN (referred to as prediction CNN and classification CNN), but the invention is not limited to this embodiment, in particular AI algorithms of different natures could be used.

Figure 1:
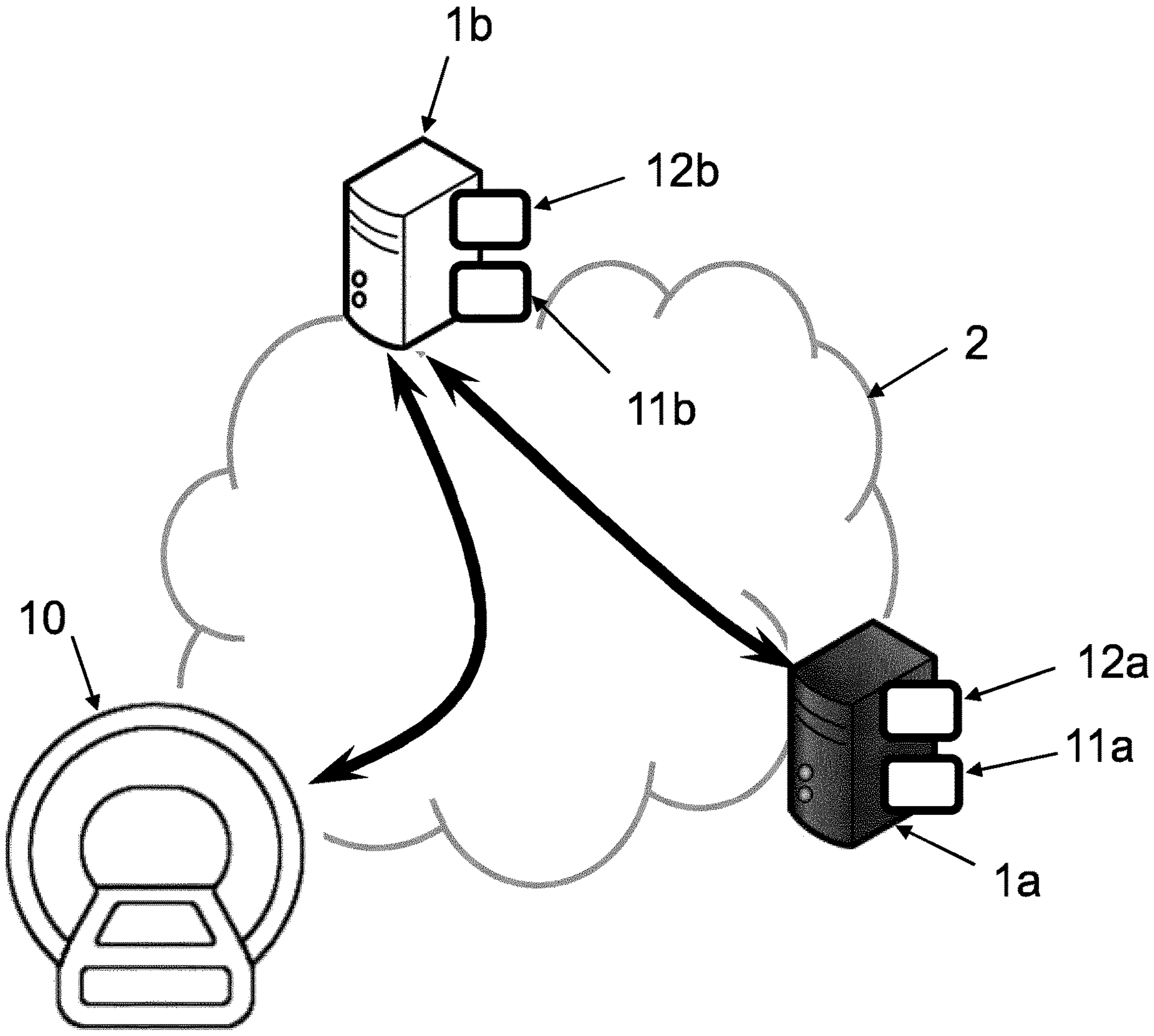
FIG. 1 illustrates an example of architecture in which the method according to the invention is performed.

The above-mentioned methods are implemented within an architecture such as illustrated in FIG. 1, by means of a first and/or second server 1*a*, 1*b*. The first server 1*a* is the training server (implementing the training method) and the second server 1*b* is a processing server (implementing the processing method). It is fully possible that these two servers may be merged.

Each of these servers 1*a*, 1*b* is typically remote computer equipment connected to an extended network 2 such as the Internet for data exchange. Each one comprises data processing means 11*a*, 11*b* of processor type (in particular the data processor 11$a$ of the first server 1$a$ have strong computing power, since learning is long and complex compared with ordinary use of the trained models), and optionally storage means 12$a$, 12$b$ such as a computer memory e.g. a hard disk. The second server 1$b$ may be connected to one or more medical imaging devices 10 as client equipment, for providing images to be processed, and receiving back parameters.

Note that it is supposed that the imaging device 10 comprises an injector for performing the injection of contrast agent, said injector applying the injection parameters.

The memory 12$a$ of the first server 1$a$ stores a training database i.e. a set of images referred to as training images (as opposed to so-called inputted images that precisely are sought to be processed). Each image of the database could be pre-contrast or contrast, and contrast images may be labelled in terms of a phase to which each image belongs (e.g. arterial, portal, delayed). Note that images corresponding the same injection (i.e. forming a sequence) are associated into sequences. Each image/set of images is also associated to the corresponding parameters (at least one injection parameter, and preferably at least one context parameter chosen among a physiological parameter and/or acquisition parameter), and to a quality level. Said quality level is in particular selected among a predefined plurality of possible quality levels.

In a preferred embodiment, there are only two quality levels: "good image quality", i.e. an image with diagnostic image quality; and "poor image quality", i.e. an image with non-diagnostic image quality. Note that there may be more quality levels. The quality levels of training images are typically obtained by consensus of a given number of expert radiologists.

Obtaining the Pre-Contrast Image

Figure 2:
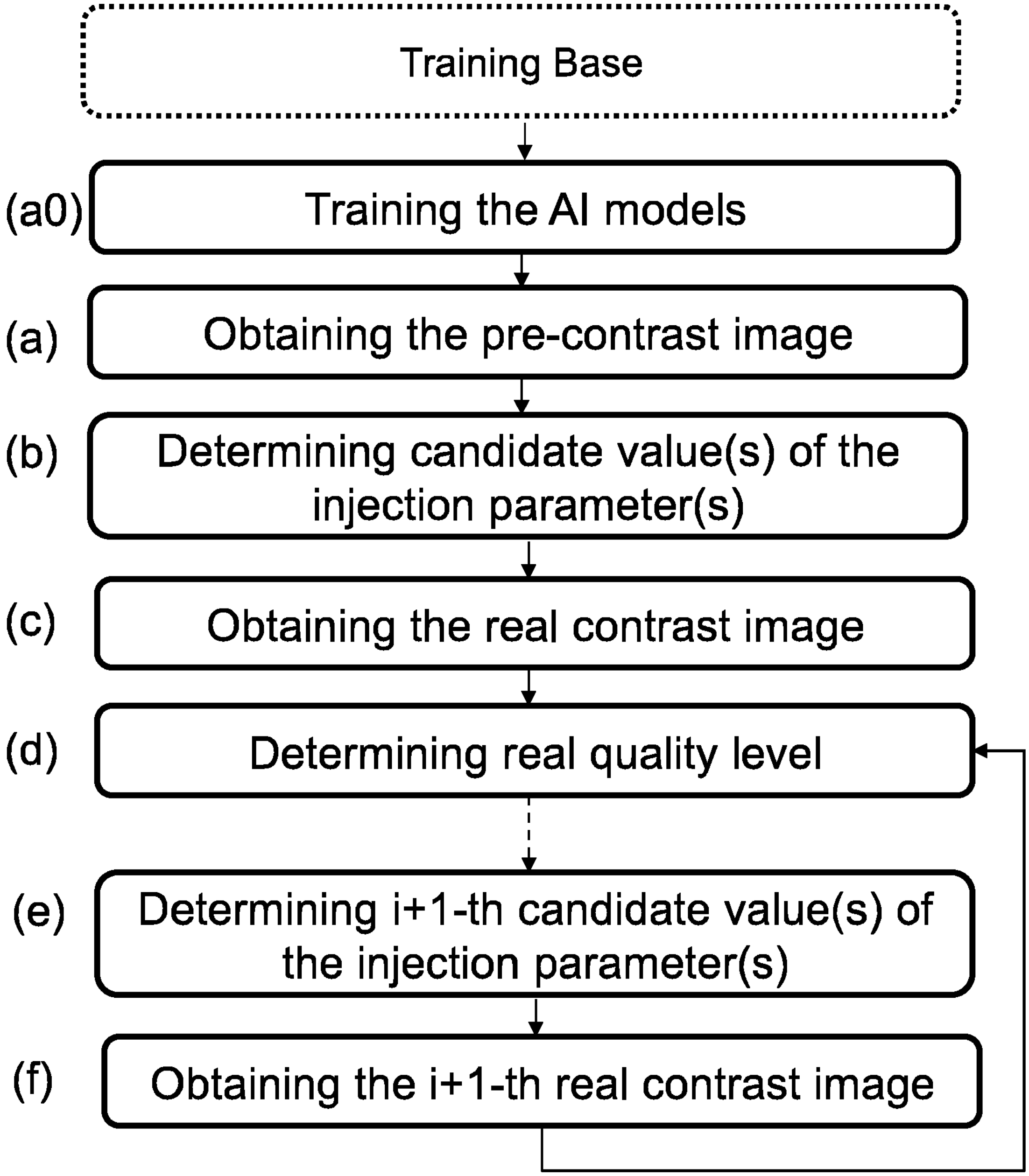
FIG. 2 illustrates an embodiment of the methods according to the invention.

As represented by FIG. 2, the method for processing at least a pre-contrast image starts with a step (a) of obtaining said pre-contrast image to be processed, preferably from a medical imaging device 10 connected to the second server 1$a$ which have acquired said pre-contrast image.

Preferably, step (a) may also comprise obtaining value(s) of at least one context parameter of said pre-contrast image, typically physiological parameter(s) and/or acquisition parameter(s). As explained, physiological parameters are parameters related to the individual patient whose body part is depicted by the images (e.g. cardiac output, patient specific hemodynamics parameters, etc.), and acquisition parameters are related to the medical imaging device 10 (i.e. settings of the medical imaging device 10, such as kVp, spatial resolution, frequency/phase encoding, compress sensing factor, etc.).

Indeed, the present invention proposes to consider acquisition parameters as also not variable (like the physiological parameters) and focus only on injection protocol parameters (amount of contrast agent, contrast injection speed, time delay to acquisition, etc.) which are to be optimized.

Note that this step (a) may be implemented by the data processor 11$b$ of the second server 1$b$ and/or by the medical imaging device 10 if for instance it associates the parameters to the pre-contrast image.

Prediction Model

In a main step (b), implemented by the data processor 11$b$ of the second server 1$b$, the prediction model is applied to said pre-contrast image.

In more details, step (b) aims at determining candidate value(s) of the at least one injection parameter, i.e. the output of said prediction model is the value(s) of the injection parameter(s).

The so-called candidate values are potentially optimized value, such that a theoretical contrast image depicting said body part during injection of contrast agent in accordance with the determined candidate value(s) of said injection parameter(s) is expected to present a target quality level, typically among said predefined plurality of possible quality levels, in particular "good" quality (if there are two quality levels).

In other words, the prediction model predicts the values of the injections parameters which should lead to the realization of a contrast image with the suitable quality level. It is to be understood that the said "good" quality is not necessarily the best possible quality. In other words, there might be "optimal" value(s) of the injection parameter(s) allowing an even better quality of contrast image than the determined candidate value(s), but in the context of the present invention it is sufficient (and much easier, which is important if the process is intended to be performed in real time) to find candidate value(s) that allows an image quality level sufficient for analysis/diagnostic purposes.

Note that the contrast image here is referred to as "theoretical" as:

(1) Said image is generally never acquired. Indeed, the prediction model merely assess the possibility of existence of said image. Note that in some embodiment the theoretical image might be simulated but it is not compulsory.

(2) The "real" contrast image depicting said body part during injection of contrast agent in accordance with the determined candidate value(s) of said injection parameter(s) may actually not present said target quality level, because there is always a probability that the prediction does not come true.

The prediction model advantageously uses the at least one context parameter as input at step (b), such that said theoretical contrast image further has the same value(s) of context parameter(s) as the pre-contrast image. In other words, the prediction model uses as input the pre-contrast image and the value(s) of said context parameter(s) of said pre-contrast image, and outputs the candidate value(s) of the injection parameter(s).

Indeed, as explained, for simplifying the process, each context parameters (acquisition parameter(s) and/or physiological parameter(s)) is supposed fixed and only values of injection protocol parameters are determined. Therefore, the pre-contrast images and the subsequent contrast images are supposed to have the same values of the context parameters.

Note that predicting candidate value(s) of the injection parameter(s) leading to a contrast image presenting a target quality level can be construed as an inverse problem. Indeed, it is actually easier to train a "test" model outputting an estimated quality of contrast image from the pre-contrast image and the candidate value(s) of the injection parameter(s) than a direct prediction model. The idea is thus to predict the candidate value(s) of the injection parameter(s) by trial-and-error, i.e. to iteratively test several possible values up to reach the target quality level. The tested values can be randomly selected, or according to a pattern.

The "test" model may be a two-step model (i.e. two sub-models) which (1) simulates the theoretical contrast image (or even generates it) from the pre-contrast image and the candidate value(s) of the injection parameter(s) (and the set context parameter(s)), and (2) estimates the quality of the simulated theoretical contrast image. The first sub-model may be a generator model for example based on a GAN (Generative adversarial network) trained for generating synthetic contrast images (a discriminator module of the GAN tries to distinguish original contrast images from a database from synthetic contrast images). The second sub-model is the classification model that will be described below.

Note that a one-step direct model or even an inverse model directly able to predict the candidate value(s) of the injection parameter(s).

Use of the Candidate Value(s) of the Injection Parameter(s)

The method preferably comprises a step (c) of providing said determined candidate value(s) of said injection parameter(s) to the medical device 10.

Therefore, a real contrast image depicting said body part during injection of contrast agent in accordance with the determined candidate value(s) of said injection parameter(s) can be acquired by said medical imaging device 10. Because of the use of the candidate value(s) of said injection parameter(s), the real contrast image is expected to present the target quality level.

As explained, the theoretical contrast image is the image to which the real contrast image is expected to look like.

Step (c) advantageously further comprises obtaining in response (at data processor 11*b* of a second server 1*b*, from the imaging device 10) the acquired real contrast image, in particular for verification of the quality.

Indeed, the real contrast image may actually not present the target quality level.

Hence, the method preferably comprises a step (d) of determining, by application of the classification model to the real contrast image, a real quality level of said real contrast image, and verifying that the expected given image quality is reached (i.e. step (d) comprises comparing said real quality level with the target quality level). If not the case, a change for value(s) of the injection parameter(s) can be asked for.

As already explained, the classification model could be any AI algorithm, in particular a CNN, taking as input the real contrast image and determining its quality level. CNN for classification of images are well known to the skilled person, see for example VGG-16 or AlexNet.

A classification model is very efficient, as the quality level can be chosen among a predefined plurality of possible quality levels as alternate classes. In particular, if there are a "good" image quality and a "poor" image quality, determining the quality level can be seen as a binary classification: does the real contrast image belong to the "good" image quality class or to the "poor" image quality class?

Dynamic Contrast Acquisition

The present method can be applied to static contrast acquisition (e.g. two images, the pre-contrast image and one contrast image, for example portal or delayed phase), but also to dynamic contrast acquisition such as DCE (dynamic contrast enhancement) involving a sequence of contrast images, i.e. a plurality of acquisitions of contrast images depicting said body part during injection of contrast agent.

In a preferred embodiment, the present method could be performed recursively for ensuring that each contrast image present the target quality level.

In the context of a sequence of contrast image, we will refer to each contrast image, candidate value(s) and quality level respectively as a i-th contrast image, i-th candidate value(s) and a i-th quality level, with i>0 their index. In order, the pre-contrast image is acquired, then the first contrast image, the second contrast image, etc.

The present method preferably comprises a step (e) of determining the (i+1)-th candidate value(s) of said injection parameter(s): the (i+1)-th theoretical contrast image depicting said body part during injection of contrast agent in accordance with the determined (i+1)-th candidate value(s) of said injection parameter(s) is expected to present the target quality level.

Note that the step (e) can be seen as a generic version of step (b), with step (b) as the "0-th" iteration of the step (e), and then the step (e) repeated as many times as there are further contrast images after the first one.

Similarly, the method preferably comprises a step (f) of providing said (i+1)-th candidate value(s) of said injection parameter(s) to the medical device 10, which is similar to step (c). A (i+1)-th real contrast image depicting said body part during injection of contrast agent in accordance with the (i+1)-th candidate value(s) of said injection parameter(s) can acquired by said medical imaging device 10. Step (f) advantageously further comprises obtaining in response (at data processor 11*b* of a second server 1*b*, from the imaging device 10) the acquired (i+1)-th real contrast image, in particular again for verification of the quality.

A new occurrence of step (d) may be performed, i.e. determining, by application of the classification model to the (i+1)-th real contrast image, a (i+1)-th real quality level of said (i+1)-th real contrast image. Again, it may comprise comparing said (i+1)-th real quality level with the target quality level. Then a new occurrence of step (e) may be performed, i.e. determining (i+2)-th candidate value(s) of the injection parameter(s), etc.

Indeed, the method advantageously comprises recursively iterating steps (d) to (f) so as to obtain a sequence of successive contrast images.

There are advantageously two cases in step (e), depending from the result of the comparison between said real quality level with the target quality level in step (d):

- if said i-th real quality level corresponds to the target quality level, the i-th candidate value(s) are kept as the (i+1)-th candidate values. Indeed, the current candidate value(s) are considered as suitable because the target quality level is reached and there is no reason to modify them.
- if said i-th real quality level is different from the target quality level, (i+1)-th candidate value(s) of the injection parameter are determined by application of the prediction model to at least the i-th real contrast image (like in step (b)), such that the (i+1)-th theoretical contrast image depicting said body part during injection of contrast agent in accordance with the determined (i+1)-th candidate value(s) of said injection parameter(s) is expected to present the target quality level. Indeed, the (i+1)-th candidate value(s) of the injection parameter are non-satisfactory because the target quality level has not been met, and new value(s) have to be determined.

Note that it may be possible to not perform any verification (i.e. no step (d)) and to always apply the prediction model (i.e. at each iteration), but the above-mentioned embodiment avoids unnecessary calls for the prediction model and is therefore faster and more resource-effective.

The prediction model may be only applied to the i-th real contrast image, but preferably, step (e) comprises combining the i-th real contrast image with the pre-contrast image and/or at least one j-th real contrast image, 0<j<i, into a combined image (even preferably combining the i-th real contrast image with the pre-contrast image and each real j-th contrast image, 0<j<i, i.e. all the i+1 previously acquired images), the prediction model being applied to the combined image.

In other words, the information from previously acquired image may be taken into account when determining the (i+1)-th candidate value(s) so as to refine this determination and improve the chances to "converge" towards stable candidate value(s) of the injection parameter(s) that will allow the target quality level for as many contrast images as possible.

There might be several implementations for combining pre-contrast/contrast images:

- the images may be aggregated into a hyper-stack with associated parameters;
- The images may be summed, averaged, etc.
- the combined image could be based on subtraction of the images to highlight the differences;
- a combination thereof, for instance a hyper-stack comprising the i-th real contrast image and the subtraction of several previous images;
- etc.

Training Method(s)

In a second aspect, there is proposed a training method, implemented by the data processor 11*a* of the first server 1*a*. Said method trains the prediction model and possibly the classification model, for processing at least a pre-contrast image depicting a body part prior to an injection of contrast agent.

By training, it is meant the determination of the optimal values of parameters and weights for these AI models.

Note that the models used in the processing method are preferably trained according to the present training method, hence referred to at step (a0) in the FIG. 2. Note that alternatively the models may be directly taken "off the shelf" with preset values of parameters and weights.

Said training method is similar to the previously described processing method, but is iteratively performed on training images of the training database, i.e. a base of training pre-contrast or contrast images respectively depicting a body part prior to and during an injection of contrast agent, each image being associated to reference value(s) of at least one injection parameter of said injection of contrast agent and a reference quality level. Training images are preferably organized into sequences corresponding to the same injection.

In particular, the training method comprises, for each of a plurality of training pre-contrast images from the training base, a step of determining candidate value(s) of said injection parameter(s) by application of the prediction model to said training pre-contrast image, such that a theoretical contrast image depicting said body part during injection of contrast agent in accordance with the determined candidate value(s) of said injection parameter(s) is expected to present a target quality level; and verifying if said theoretical contrast image presents said target quality level.

The training may be direct (if there is an identified contrast image presenting said target quality level belonging to the same sequence as said training pre-contrast image, said theoretical contrast image can be verified by comparing the determined candidate value(s) and reference value(s) of the injection parameter(s) of said identified training image), or as explained there may be two sub-models that are independently trained on the training base:

- a generator model for simulating or generating the theoretical contrast image depicting said body part during injection of contrast agent in accordance with the determined candidate value(s) of said injection parameter(s), for instance trained so as to produce theoretical contrast images as realistic as possible; and
- a classification model for determining the quality level of a contrast image, for instance trained so as to determine for training contrast images candidate quality level as close as possible the reference quality level of the training contrast image.

Any training protocol adapted to the AI types of the prediction/classification models known to a skilled person may be used.

Computer Program Product

In a third and fourth aspect, the invention provides a computer program product comprising code instructions to execute a method (particularly on the data processor 11*a*, 11*b* of the first or second server 1*a*, 1*b*) according to the second aspect of the invention for training at least a prediction model, or a method according to the first aspect of the invention for processing at least a pre-contrast image depicting a body part prior to an injection of contrast agent, and storage means readable by computer equipment (memory of the first or second server 1*a*, 1*b*) provided with this computer program product.

The invention claimed is:

1. A method comprising the implementation, by a data processor of a server, of steps of:

(a) obtaining a pre-contrast image depicting a body part of a patient prior to an injection of contrast agent in the patient, wherein said pre-contrast image is acquired by a medical imaging device connected to the server;

(b) determining candidate value(s) of at least one injection parameter for injecting the contrast agent by application of a prediction model to said pre-contrast image, (c) providing said determined candidate value(s) of said injection parameter(s) to the medical imaging device, and obtaining in response a real contrast image depicting said body part during injection of contrast agent in accordance with said determined candidate value(s) of said injection parameter(s), wherein said real contrast image is acquired by said medical imaging device, (d) determining, by application of a classification model to the real contrast image, a real quality level of said real contrast image among a predefined plurality of possible quality levels; and comparing said real quality level with a target quality level;

wherein said real contrast image, candidate value(s) and real quality level are respectively a i-th real contrast image, i-th candidate value(s) and a i-th real quality level, with i>0, wherein the method further comprises a step (e) of, if said i-th real quality level is different from the target quality level, determining (i+1)-th candidate value(s) of the injection parameter by application of the prediction model to at least the i-th real contrast image.

2. A method according to claim 1, wherein step (a) also comprises obtaining value(s) of at least one context parameter of said pre-contrast image and wherein said prediction model uses said at least one context parameter as input at step (b).

3. The method according to claim 2, wherein said context parameter(s) is (are) physiological parameter(s) and/or acquisition parameter(s).

4. The method according to claim 1, wherein step (e) comprises combining the i-th real contrast image with the pre-contrast image and/or at least one j-th real contrast image, $0<j<i$, into a combined image, the prediction model being applied to the combined image.

5. The method according to claim 1, wherein step (e) comprises, if said i-th real quality level corresponds to the target quality level, keeping the i-th candidate value(s) as the (i+1)-th candidate values, wherein the method further comprises a step (f) of providing said (i+1)-th candidate value(s) of said injection parameter(s) to the medical imaging device (10), and obtaining in response a (i+1)-th real contrast image depicting said body part during injection of contrast agent in accordance with the (i+1)-th candidate value(s) of said injection parameter(s), wherein the (i+1)-th real contrast image is acquired by said medical imaging device (10).

6. The method according to claim 5, comprising recursively iterating steps (d) to (f) so as to obtain a sequence of successive contrast images.

7. The method according to claim 1, wherein said prediction model comprises a Convolutional Neural Network, CNN.

8. The method according to claim 1, wherein the classification model comprises a Convolutional Neural Network, CNN.

9. A non-transitory computer medium comprising code instructions that, when executed by a computer, cause the computer to execute a method according to claim 1.

* * * * *